United States Patent [19]
Sano et al.

[11] Patent Number: 5,130,281
[45] Date of Patent: Jul. 14, 1992

[54] DIELECTRIC CERAMIC COMPOSITIONS AND MANUFACTURING METHOD OF DIELECTRIC CERAMICS

[75] Inventors: Harunobu Sano; Nobuyuki Wada; Yoshiaki Kohno; Yukio Sakabe, all of Nagaokakyo, Japan

[73] Assignee: Murata Manufacturing Co., Ltd., Japan

[21] Appl. No.: 727,425

[22] Filed: Jul. 9, 1991

[30] Foreign Application Priority Data

Jul. 10, 1990 [JP] Japan ................... 2-183414
Jul. 10, 1990 [JP] Japan ................... 2-183415

[51] Int. Cl.$^5$ ................................ C04B 35/46
[52] U.S. Cl. ..................... 501/138; 501/139
[58] Field of Search ............ 501/137, 138, 139

[56] References Cited

U.S. PATENT DOCUMENTS

| | | | |
|---|---|---|---|
| 4,535,064 | 8/1985 | Yoneda | 501/139 |
| 4,764,494 | 8/1988 | Sakabe et al. | 501/138 |
| 4,767,732 | 8/1988 | Furukawa et al. | 501/138 |

FOREIGN PATENT DOCUMENTS

| | | | |
|---|---|---|---|
| 2637762 | 2/1978 | Fed. Rep. of Germany | 501/139 |
| 50-008800 | 4/1975 | Japan | 501/139 |
| 50-054900 | 5/1975 | Japan | 501/139 |
| 50-067500 | 6/1975 | Japan | 501/139 |

*Primary Examiner*—William R. Dixon, Jr.
*Assistant Examiner*—Anthony J. Green
*Attorney, Agent, or Firm*—Ostrolenk, Faber, Gerb & Soffen

[57] ABSTRACT

The dielectric ceramic composite according to the invention contains at least one kind of lanthanum oxide, cerium oxide, neodymium oxide, praseodymium oxide and samarium oxide at an amount of 2.5–5.0 mol % and zirconium oxide, tin oxide and titanium oxide at an amount of 0.5–8.5 mol% in a formula $(Zr_{1-a-b}Sn_aTi_b)O_3$ (where $a>0$, $b \geq 0$, $0 < a+b \leq 1.0$) to barium titanate of 100 mol % containing alkali metal oxide less than 0.03% by weight as an impurity. Barium zirconate and barium stannate at an amount of 0.5–5.0 mol % in a formula $Ba(Zr_{1-a}Sn_a)O_3$ (where $0 < a \leq 1.0$) and titanium oxide at an amount of 1.5–6.0 mol % may be added instead of zirconium oxide, tin oxide, titanium oxide. The manufacturing method of dielectric ceramic according to the invention is a method which comprises a process of firing, in an atmosphere of 60% or more oxygen concentration, moldings of a composition containing at least one kind of a lanthanum compound, cerium compound, neodymium compound, praseodymium compound, and a samarium compound and further containing a zirconium compound, tin compound, and a titanium compound to a barium titanate base material.

7 Claims, 2 Drawing Sheets

F I G. 1
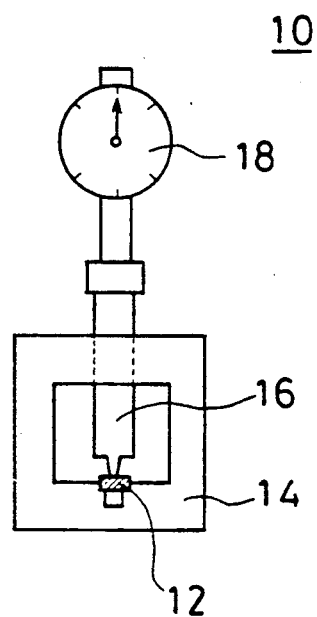

DIELECTRIC CERAMIC COMPOSITIONS AND MANUFACTURING METHOD OF DIELECTRIC CERAMICS

BACKGROUND OF THE INVENTION

1. Field of the Invention

This invention relates to dielectric ceramic compositions and a method of manufacturing dielectric ceramics. It relates more particularly, to compositions which contain barium titanate as a main component and are used for ceramic capacitors for example and the manufacturing method of the dielectric ceramics.

2. Description of the Prior Art

Many dielectric ceramic compositions which contain barium titanate as a main component and are used for ceramic capacitors are well known. Barium titanate has the Curie point at about 120° C. and exhibits a dielectric constant at that temperature on the other hand, it does not of about have a large dielectric constant at room temperature. A material called a shifter is added to the main component to shift the Curie point to a point near room temperature, whereby the dielectric ceramic compositions are provided with a large dielectric constant at room temperature. As shifter materials, tin oxide, zirconium oxide and rare earth metal are known.

Plate-type ceramic capacitors having a main component of barium titanate and containing such a shifter have been manufactured. But recently lamination technology has improved and dielectric green sheets 30–80 μm thick have become available. So-called monolithic ceramic capacitors which have a plurality of dielectric thin film layers laminated between internal electrodes have entered the electronic industry, and conventional dielectric ceramic compositions have come into use in such ceramic capacitors.

On the other hand, ceramic capacitors recently produced have a trend to miniaturization, especially monolithic capacitors which tend to contain thin layers 10–20 μm thick. A capacitor of this type is exposed to an electric field intensity ten times larger than a single plate type of capacitor having a thickness of 100–10000 μm. Thus, a composition having less dependence on voltage is required as compared with the plate type capacitor.

In addition, as the thickness of a dielectric layer is reduced, structural defects of ceramics are apt to be reflected in the characteristics of a capacitor and, therefore, it is required for the ceramics to have a uniform and microcrystalline particle size (grain size), and fewer pores, the pores being of a minute size.

A dielectric ceramic material containing barium titanate of a small grain size as a main component is disclosed in the Japanese Patent Application No. 18059/1981, No. 16809/1982, No. 105919/1982, and No. 196469/1982. These dielectric ceramics containing barium titanate as a main component are reduced in grain size by adding cerium oxide, or cerium oxide and barium zirconate, or neodymium oxide, to barium titanate, and firing the materials in an air atmosphere.

These dielectric ceramics with small grain sizes have a maximum dielectric constant as small as about 10000 at room temperature, and this value is smaller than that of the ceramics with large grain sizes. Thus when miniaturized, it is difficult obtain a monolithic capacitor with a large electrostatic capacitance. Further, the problem of large temperature variations of the dielectric constant remains to be solved.

SUMMARY OF THE INVENTION

Therefore, it is a principal object of the present invention to provide dielectric ceramic compositions capable of providing dielectric ceramics having a small grain size, large dielectric constant, small temperature characteristics of dielectric constant and small voltage dependence.

It is another object of the invention to provide a dielectric ceramic manufacturing method capable of obtaining dielectric ceramics having a large dielectric constant regardless of a small grain size.

The inventor of the present invention studied, in many ways, the cause of a small dielectric constant less than 10000 when dielectric ceramic has a grain size as small as 1 –3 μm.

As a result of the study, the inventor discovered that the dielectric ceramics cannot have a large dielectric constant when the barium titanate which is the main component has many kinds of impurities and a large content of them.

Further, the inventor found that when at least one compound selected from the group consisting of lanthanum oxide, cerium oxide, neodymium oxide, praseodymium oxide, and samarium oxide is added to barium titanate containing a small amount of alkali metal oxide, the grain size becomes small and the ceramic exhibits a large dielectric constant.

Still further, the inventor discovered that by adding tin oxide and, if necessary, at least one compound selected from among zirconium oxide and titanium oxide to the main component, dielectric ceramics having small temperature characteristics of dielectric constant and less dependence on voltage can be obtained.

Furthermore, the inventor discovered that by adding barium zirconate, barium stannate and titanium oxide, dielectric ceramic having a small temperature characteristic of dielectric constant and less dependence on voltage can be obtained.

The dielectric ceramic compositions according to the invention contains at least one compound selected from the group consisting of lanthanum oxide, cerium oxide, neodymium oxide, praseodymium oxide and samarium oxide in an amount of 2.5–5.0 mol % and zirconium oxide, tin oxide and titanium oxide at in amount of 0.5–8.5 mol % according to a formula $(Zr_{1-a-b} Sn_a Ti_b)O_3$ (where $a>0$, $b \geq 0$, $0 < a+b \leq 1.0$), to barium titanate of 100 mol % containing alkali metal oxide less than 0.03% by weight as an impurity.

Another dielectric ceramic composition according to the invention contains at least one compound selected from the group consisting of lanthanum oxide, cerium oxide, neodymium oxide, praseodymium oxide and samarium oxide in an amount of 2.5–5.0 mol %, barium zirconate and barium stannate in an amount of 0.5–5.0 mol % according to a formula $Ba(Zr_{1-a} Sn_a)O_3$ (where $0 < a \leq 1.0$), and titanium oxide ion an amount of 1.5–6.0 mol %, to barium titanate of 100 mol % containing alkali metal oxide less than 0.03% by weight as an impurity.

The method of manufacturing dielectric ceramics according to the invention is a method of producing a ceramic material which contains at least one compound selected from the group consisting of lanthanum oxide, cerium oxide, neodymium oxide, praseodymium oxide, and samarium oxide in an amount of 2.5–5.0 mol %, and zirconium oxide, tin oxide, and titanium oxide at an amount of 0.5–8.5 mol % according to a formula $(Zr_{1-a-}$ $bSn_aTi_b)O_2$ (where $a > 0$, $b-0$, $0 < a+b \leq 1.0$), to barium titanate of 100 mol %, the method comprising a process of firing, in an atmosphere of 60% or more oxygen concentration, moldings of a composition containing at least one compound selected from the group consisting of lanthanum compound, cerium compound, neodymium compound, praseodymium compound, and samarium compound, and further containing a zirconium compound, a tin compound, and a titanium compound to a barium titanate base material.

Now, the reason why the composition of the dielectric ceramic compositions of the invention is so defined will be explained.

Heretofore, barium titanate used in mass production in the ceramic industry has showed a purity of 98.5–99.5% and generally contains both alkaline earth metal such as SrO, CaO, MgO and alkali metal oxide such as $Na_2O$, $K_2O$ as impurities, and mixtures such as $Al_2O_3$, $SiO_2$ which are mixed during crushing and mixing of the materials.

This invention was devised by discovering that when the contents of impurities in barium titanate, especially, alkali metal oxide like $Na_2O$, $K_2O$, exceed a predetermined limit, the dielectric characteristic of the ceramics is deteriorated.

That is, in the dielectric ceramic compositions according to the invention, the content of alkali metal oxide of the impurities in barium titanate is limited to less than 0.03% by weight, because when that content exceeds 0.03% by weight, the dielectric constant decreases to less than 10000.

Further, in the dielectric ceramic compositions of the invention, at least one compound selected from the group consisting of lanthanum oxide, cerium oxide, neodymium oxide, praseodymium oxide, and samarium oxide in an amount of 2.5–5.0 mol % is added to barium titanate of 100 mol % containing an alkali metal oxide impurity less than 0.03% by weight. When this content is less than 2.5 mol %, the grain size of the dielectric ceramics obtained does not become sufficiently small. On the other hand, when this content exceeds 5.0 mol %, the Curie point shifts from a point at room temperature to a point at low temperature and the dielectric constant at room temperature becomes small or the degree of sintering becomes lower.

In this way, when at least one compound selected from the group consisting of lanthanum oxide, cerium oxide, neodymium oxide, praseodymium oxide, and samarium oxide at an amount of 2.5–5.0 mol % is added to barium titanate of 100 mol % containing alkali metal oxide less than 0.03% by weight as an impurity, dielectric ceramics can be obtained which have a small grain size and a large dielectric constant, greater than 11000.

However, with such ceramic compositions the, temperature characteristic of dielectric constant becomes large and the F characteristic of the JIS standard can not be met. Further, dependence on voltage becomes large and these conditions are unfavorable to a thin ceramic dielectric layer of as used in monolithic ceramic capacitors.

In order to solve these problems, zirconium oxide, tin oxide, and titanium oxide are added to the ceramic compositions within a range of 0.5–8.5 mol % in a formula $(Zr_{1-a-b} Sn_a Ti_b) O_2$ (where, $a > 0$, $b \geq 0$, $0 < a+b \leq 1.0$). When the content of zirconium oxide, tin oxide, and titanium oxide is less than 0.5 mol %, the temperature characteristic of the dielectric constant is not improved, and the dependence on voltage is large.

On the other hand, when the content of zirconium oxide, tin oxide, and titanium oxide exceeds 8.5 mol %, the temperature characteristic of the dielectric constant is improved, but the dielectric constant decreases.

Further, in order to solve the above-mentioned problems, barium zirconate and barium stannate in an amount of 0.5–5.0 mol % in a formula $Ba(Zr_{1-a} Sn_a) O_3$ (where, $0 < a \leq 1.0$) and titanium oxide at an amount of 1.5–6.0 mol % may be added to the ceramic compositions instead of zirconium oxide, tin oxide, and titanium oxide. By adding barium zirconate and barium stannate in an amount of 0.5–5.0 mol % in a formula $Ba(Zr_{1-a} Sn_a) O_3$ (where, $0 < a \leq 1.0$), the effect becomes larger. When the content of barium zirconate and barium stannate is less than 0.5 mol %, the temperature characteristic of the dielectric constant is not improved, and the dependence on voltage is large. On the other hand, when the content of barium zirconate and barium stannate exceeds 5.0 mol %, the temperature characteristic of the dielectric constant is improved, but the dielectric constant decreases. When the content of titanium oxide is less than 1.5 mol % the, degree of sintering becomes lower and the firing temperature becomes high. On the other hand, when the content of titanium oxide is exceeds 6.0 mol %, the insulation resistances at room temperature and at high temperature decrease.

According to the invention, a small quantity of $MnCO_3$, $Fe_2O_3$ or the like is added as a reduction inhibitor to the main component, and characteristics of the ceramic obtained are not deteriorated.

According to the invention, dielectric ceramics having a small grain size, large dielectric constant, small temperature characteristics of dielectric constant, and less dependence on voltage can be obtained.

Further, according to the invention, dielectric ceramics having a larger dielectric constant regardless of a small grain size can be obtained.

The above and other objects, features, aspects and advantages of the present invention will more fully be apparent from the following detailed description of the embodiments with accompanying drawings.

BRIEF DESCRIPTION OF THE DRAWINGS

FIG. 1 is an illustrative view showing a breakage resistant strength measuring device for dielectric ceramic specimens.

DESCRIPTION OF THE PREFERRED EMBODIMENTS

Embodiment 1

Figure 2A:
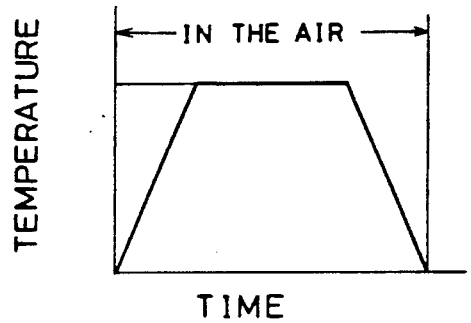
FIG. 2(A), (B) and (C) are graphs showing respective firing patterns (relations between firing atmospheres, temperature and time).

$BaCO_3$ and $TiO_2$ having various purities were used as raw materials and both materials were weighed so that their mole ratio becomes 1.000 and a mixture was obtained by wet-blending them with a ball mill using zirconia balls for 16 hours.

After evaporating a water content of the mixture thus obtained, the mixture was calcinated at 1150° C. for 2 hours and it was crushed again by the ball mill until a mean grain size becomes less than 2 μm. In this way, four kinds of barium titanate having different grades of purity shown in Table 1 lines A, B, C, and D, were obtained.

Then, lanthanum oxide ($La_2O_3$), cerium oxide ($CeO_2$), neodymium oxide ($Nd_2O_3$), praseodymium oxide (Pr$_6$O$_{11}$), samarium oxide (Sm$_2$O$_3$), zirconium oxide (ZrO$_2$), tin oxide (SnO$_2$), and titanium oxide (TiO$_2$) were weighed obtain respective amounts in mol % as shown in Table 2 and added to barium titanate of 100 mol %, and further, vinyl acetate binder was added, and the materials were wet-blended for 16 hours to obtain a final mixture. After drying the mixture and granulating it, the materials were formed into disks of 10 mm diameter and 0.5 mm thickness with a pressure of 2000 kg/cm$^2$ and these disks were fired at the respective temperatures of Table 3 for 2 hours and disk ceramics were obtained.

The surface of the disk was observed with a magnification of 2000 with an electron microscope to measure a grain size.

Silver electrodes were baked on both main faces of the ceramics to obtain a measurement sample (capacitor) and a dielectric constant $\epsilon$, dielectric loss (tan $\delta$ (%)) and change rate of electrostatic capacitance with temperature ($\Delta C/C_{20}$) were measured. Further, an AC voltage of 100 V/mm, 1 kHz was applied to the sample to measure the dielectric loss (tan $\delta$ (%)).

The dielectric constant $\epsilon$ and dielectric loss (tan $\delta$) were measured at 25° C. and a frequency of 1 kHz. The change rate of electrostatic capacitance with temperature was determined by values measured at $-25°$ C., $+20°$ C. and $+85°$ C., and given by the equation:

$$(\Delta C/C_{20}) = (C_t - C_{20})/C_{20}$$

where, $C_t$ is the capacitance measured at $-25°$ C. or $+85°$ C., and $C_{20}$ is that at 20° C.

These measurement results are shown in Table 3.

Next, the reason why the ranges of the components of the dielectric ceramic composition are as set forth above will be explained on the basis of data of Tables 1, 2 and 3.

When the content of lanthanum oxide, cerium oxide, neodymium oxide, praseodymium oxide, and samarium oxide is less than 2.5 mol % like the sample numbers and 2, the dielectric constant becomes small or the grain size becomes larger than 3 $\mu$m. On the other hand, when the content of these materials exceeds 5 mol % like the sample numbers 13 and 14, the dielectric constant becomes small or the firing temperature required becomes high.

When the content of zirconium oxide, tin oxide and titanium oxide is less than 0.5 mol % like the sample number 15, the change rate of electrostatic capacitance exceeds $-80\%$ and this is unfavorable. On the other hand, when the content of zirconium oxide, tin oxide and titanium oxide exceeds 8.5 mol % like the sample number 16, the rate of capacitance variation is small but the dielectric constant greatly decreases. Further, even when the content of zirconium oxide, tin oxide, and titanium oxide falls within a range of 0.5-8.5 mol % like the sample number 17, if tin oxide and titanium oxide are not contained, that is, a+b=0, the dielectric loss becomes large when an AC voltage of 100 v/mm is applied.

When barium titanate materials C and D containing a relatively large amount of alkali metal oxide like the sample numbers 18 and 19 are used, the dielectric constant becomes small.

In contrast to this, in the samples using the dielectric ceramic compositions within the range defined by this invention(refer to the samples numbers 3-12), the grain sizes of ceramic sintered bodies are as small as 1-3 $\mu$m and dielectric constants at least as large as 1000, and further, dielectric losses are as small as within a range of 3.0% with application of an AC voltage of 100 V/mm. Still further, the change rates of electrostatic capacitance with temperature are within a range of $-80\%$ and this meets the F characteristic of the JIS standard.

Embodiment 2

By using the same method as embodiment 1, barium titanate having different grades of purity shown in Table 1 lines A, B, C, and D, were obtained.

Then, lanthanum oxide (La$_2$O$_3$), cerium oxide (CeO$_2$), neodymium oxide (Nd$_2$O$_3$), praseodymium oxide (Pr$_6$O$_{11}$), samarium oxide (Sm$_2$O$_3$), barium zirconate (BaZrO$_3$), barium stannate (BaSnO$_3$), and titanium oxide (TiO$_2$) were weighed obtain respective amounts of in mol % as shown in Table 4 and added to barium titanate of 100 mol %, and further, vinyl acetate binder was added, and the materials were wet-blended for 16 hours to obtain a final mixture. After drying the mixture and granulating it, the materials were formed into disks of 10 mm diameter and 0.5 mm thickness with a pressure of 2000 kg/cm$^2$ and these disks were fired at the respective temperatures of Table 5 for 2 hours and disk ceramics were obtained.

By using the same method as embodiment 1, a measurement sample (capacitor) is obtained, and a dielectric constant $\epsilon$, dielectric loss (tan $\delta$ (%)), change rate of electrostatic capacitance with temperature and dielectric loss (tan $\delta$ (%)) when applying AC voltage were measured. Further, for measuring insulation resistance, resistivity $\rho$ ($\Omega$cm) was measured at room temperature and 125° C. by applying an AC voltage of 100 V for 2 minutes by using the insulation resistance meter. And, these measurement results are shown in Table 5.

Next, the reason for defining the ranges of the components of the dielectric ceramic composition are defined above will be explained on the basis of data of Tables 1, 4 and 5.

When the content of lanthanum oxide, cerium oxide, neodymium oxide, praseodymium oxide, and samarium oxide is less than 2.5 mol % like the sample numbers 101 and 102, the dielectric constant becomes small or the grain size becomes larger than 3 $\mu$m. On the other hand, when the content of these materials exceeds 5 mol % like the sample numbers 113 and 114, the dielectric constant becomes small or the firing temperature required becomes high.

When the content of barium zirconate and barium stannate is less than 0.5 mol % like the sample number 115, the rate of capacitance variation exceeds $-80\%$ and this is unfavorable. On the other hand, when the content of barium zirconate and barium stannate exceeds 5.0 mol % like the sample number 116, the rate of capacitance variation is small but the dielectric constant greatly decreases. Further, when barium stannate is not completely contained like the sample number 117, the dielectric loss becomes large when an AC voltage of 100 V/mm is applied.

When barium titanate materials C and D containing a relatively large amount of alkali metal oxide like the sample numbers 118 and 119 are used, the dielectric constant becomes small.

In contrast to this, in the samples using the dielectric ceramic compositions within the range defined by this invention (refer to the samples numbers 103-112), the grain sizes of ceramic sintered bodies are as small as 1-3 $\mu$m and dielectric constants are at least as large as 11000, and further, dielectric losses are as small as within a range of 3.0% with application of an AC voltage of 100 V/mm. Still further, the change rates of electrostatic capacitance are within a range of −80% and this meets the F characteristic of the JIS standard. Furthermore, resistivity at room temperature is at least as large as more than $10^{13}$ Ωcm, and resistivity at high temperature is as large as $10^{10}$ Ωcm.

Embodiment 3

Material slurry was obtained by adding mixed aqueous solution of organic binder, dispersant and defoaming agent of 15% by weight to materials weighed so that they may form the composition of the sample number 8 of Table 2, and crushing and mixing the materials with water of 50% by weight with a ball mill. Using this material slurry, ceramic green sheets of 22 μm thickness were produced by the doctor blade method, and on these ceramic green sheets, internal electrode palladium paste was printed by screen printing. Then, a plurality of ceramic green sheets were laminated so that the printed palladium paste layers oppose each other and the sheets were pressed to obtain a laminated body.

Then, the laminated body was fired at 1320° C. for 2 hours to obtain a sintered body and silver paste was coated on both end faces of the sintered body and the paste was baked in the air at 800° C. to form external electrodes connected with the internal electrodes. In this way, monolithic ceramic capacitors were obtained. The dimension of this monolithic ceramic capacitor is as follows.

| Outside dimension | |
|---|---|
| width: | 1.6 mm |
| length: | 3.2 mm |
| thickness: | 1.2 mm |
| Thickness of dielectric ceramic layers: | 13 μm |
| Number of effective dielectric ceramic layers: | 19 |
| Opposite area of each pair of internal electrodes: | 2.0 mm$^2$ |

Concerning the samples of the monolithic ceramic capacitors thus obtained, electrostatic capacity C (nF) and dielectric loss (tan δ (%)) were measured at 25° C., using an AC voltage of 1 kHz, 1 Vrms. Also, insulation resistance IR (Ω) was measured with a DC voltage of 25 V application for 2 minutes. Further, a change rate of electrostatic capacitance with temperature (ΔC/C$_{20}$) was measured as was done with embodiment 1. Still further, a DC breakdown voltage value BDV (V) and breakage-resistance strength were measured.

By the way, the breakage-resistance strength was measured with the breakage-resistance strength measuring device 10 of FIG. 1. In FIG. 1, numeral 12 denotes a monolithic ceramic capacitor that is a test sample, and 14 represents a sample holding base. The capacitor 12 is placed on the sample holding base 14 and is pressurized by a pressure pin 16. The applied pressure is indicated by a tension gage 18 with a leaving pointer. In the case of this test, a jig span of the sample holding base 14 was 2 mm.

As a comparative example, adding BaZrO$_3$ of 18.5 mol % and CaZrO$_3$ of 8.9 mol % to BaTiO$_3$ of 100 mol %, monolithic ceramic capacitors were made by the same method as the above-mentioned. Concerning the comparative examples, the above characteristics were measured.

Then, the respective surfaces of the monolithic ceramic capacitors were observed with a magnification of 2000 with an electron microscope and the grain sizes were measured. The test results are shown in table 6.

As can be seen from Table 6, the monolithic ceramic capacitors made of materials having the composition of the invention exhibit a small grain size and low dielectric loss as compared with the comparative example. Further, the monolithic ceramic capacitor made of the materials of the invention has two times as high a dielectric breakdown voltage and breakage-resistance strength as the comparative example has.

Embodiment 4

Material slurry was obtained by adding mixed aqueous solution of organic binder, dispersant and defoaming agent of 15% by weight to materials weighed so that they may form the composition of the sample number 111 of Table 4, and crushing and mixing the materials with water of 50% by weight with a ball mill. By using the same method as embodiment 3, monolithic ceramic capacitors are obtained by using the material slurry.

Concerning the samples of the monolithic ceramic capacitors thus obtained, electrostatic capacitance C (nF), dielectric loss (tan δ (%)), insulation resistance IR (Ω), change rates of electrostatic capacitance (ΔC/C$_{20}$), DC breakdown voltage value BDV (V), breakage-resistance strength and grain size were measured under the same condition as embodiment 3.

By using the same method as embodiment 3, comparative examples were made, and the above characteristics were measured. The measuring results are shown in table 7.

As can be seen from Table 7, the monolithic ceramic capacitors made of materials having the composition of the invention exhibit a small grain size and low dielectric loss as compared with the comparative example. Further, the monolithic ceramic capacitor made of the materials of the invention has two times as high a dielectric breakdown voltage and break-resistant strength as the comparative example has.

Embodiment 5

First, weighing barium carbonate and titanium oxide at an amount of mol ratio 1:1 and wet-blending the materials by a ball mill using zirconia balls for 16 hours, a mixture was obtained. Then, after evaporating a water content of the mixture obtained, the mixture was held at 1150° C. for 2 hours and it was calcinated, then it was crushed again by the ball mill until a mean grain size became less than 2 μm and micropowder of barium titanate was obtained.

Next, to the barium titanate micropowder thus obtained, lanthanum oxide, cerium oxide, praseodymium oxide, neodymium oxide, samarium oxide, zirconium oxide, tin oxide, and titanium oxide weighed at the respective amounts in Table 8 were selectively added, and further vinyl acetate binder was added and the materials were wet-blended for 16 hours.

Then, after drying the material and granulating it, disks with a diameter of 10 mm and a thickness of 0.5 mm were obtained by pressing the material with a 2000 kg/cm$^2$ pressure. Then, the disks were fired at the condition of Table 8 to prepare dielectric ceramics. Firing patterns A, B and C of the firing conditions are as follows.

In the firing pattern A, as shown in FIG. 2(A), temperature is raised to the firing temperature of Table 8 in the air at a rate of 200° C./hour, then this firing temperature is held for 2 hours and thereafter is decreased to room temperature at a rate of 200° C./hour.

Figure 2B:
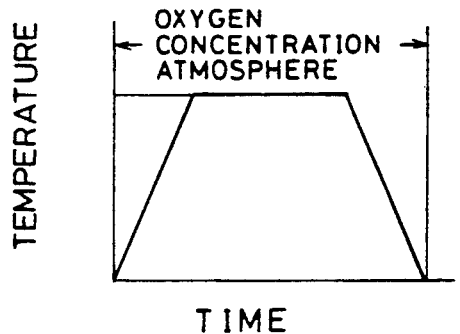

In the firing pattern B, as shown in FIG. 2(B), temperature is raised to the firing temperature in the oxygen concentration atmosphere both indicated in Table 8 at a rate of 200° C./hour, then this firing temperature is held for 2 hours and thereafter is decreased to room temperature at a rate of 200° C./hour.

Figure 2C:
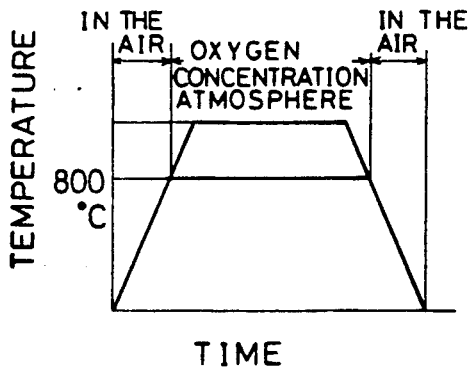

In the firing pattern C, as shown in FIG. 2(C), temperature is raised to 800° C. in the air at a rate of 200° C./hour, and continuously raised from 800° C. to the firing temperature in the oxygen concentration atmosphere both indicated in Table 8 at the same rate, and this firing temperature is held for 2 hours in the oxygen atmosphere, and thereafter is decreased to 800° C. at a rate of 200° C./hour and then continuously decreased to room temperature in the air again at the same rate.

Ceramic surfaces thus obtained were observed with a magnification of 2000 with an electron microscope to measure a grain size.

Next, silver electrodes are applied on both main faces of the ceramic to make measurement samples (capacitors), the dielectric constants $\epsilon$, dielectric losses (tan $\delta$ (%)) and change rates of electrostatic capacitance with temperature variation at room temperature were measured. The dielectric losses (tan $\delta$ (%)) were measured by applying an AC voltage of 100 V/mm, 1 kHz.

Further, the dielectric constants $\epsilon$ and dielectric losses (tan $\delta$) were measured at 25° C. and a frequency of 1 kHz, and the change rates of electrostatic capacitance with temperature ($\Delta C/C_{20}$) were measured as in embodiment 1.

The measurement results mentioned above are shown in Table 9.

As can be clearly seen from Table 8 and 9, the samples made by the dielectric ceramic manufacturing method of the invention (refer to samples numbers 24–33) exhibited sintered body grain sizes as small as 1–3 $\mu$m, and moreover, large dielectric constants more than 13000. Further, the change rate of electrostatic capacitance with temperature at 85° C. was less than $-80$ % and met the F characteristics, that is, temperature characteristics of the JIS standard (change rates of electrostatic capacitance at $-25°$ C.–+85° C. are within a range of $-80\%–30\%$ taking a capacitance at 20° C. as a reference).

In addition, the dielectric loss (tan $\delta$) is at least as small as less than 3.0% when an AC voltage of 100 V/mm is applied.

Concerning the samples outside the range of this invention (refer to samples numbers 21–23 and 34–38), the the characteristic of these samples can be understood as follows.

The sample numbers 21 and 22 have a relatively small amount of additives of lanthanum oxide, cerium oxide, neodymium oxide, and samarium oxide and exhibit small dielectric constants at room temperature.

The sample number 23 has a small amount of additives of zirconium oxide, tin oxide, and titanium oxide, and the change rate of electrostatic capacitance with temperature exceeds $-80\%$, and can not meet the F characteristics, that is, temperature characteristic of the JIS standard.

The sample number 34 has a relatively large amount of additives of cerium oxide, neodymium oxide and samarium oxide, thus the Curie point shifts to a point at low temperature and the dielectric constant at room temperature becomes small.

The sample number 35 has a relatively large amount of additives of zirconium oxide, tin oxide and titanium oxide, thus the Curie point shifts to a point at low temperature and the dielectric constant at room temperature becomes small.

The sample number 36 contains no additives of tin oxide and titanium oxide (a=b=0), thus the dielectric loss tan $\delta$ becomes large when an AC voltage of 100 V/mm is applied.

The sample numbers 37 and 38 are exposed to low oxygen concentration during firing and the dielectric constants become small.

In contrast to these, according to the dielectric ceramic manufacturing method of the present invention, although having a small grain size, dielectric ceramic having a large dielectric constant can be obtained.

Further, using such dielectric ceramics, monolithic ceramic capacitors having smaller sizes and larger capacities as compared with the conventional monolithic ceramic capacitors can be obtained.

In the above embodiments 1, 3 and 5, many kinds of oxide were used as compounds to be added to barium titanate, but those compounds are not limited to the oxides and the following compounds may be used.

| | |
|---|---|
| Lanthanum compounds | $La_2CO_3$, $La(NO_3)_2$, $La(C_2O_4)_3$ |
| Cerium compounds | $CeCO_3$, $Ce(NO_3)_3$, $Ce(OH)_4$ |
| Neodymium compounds | $Nd(OH)_3$, $Nd(NO_3)_3$, $Nd_2(CO_3)_3$, $Nd_2(C_2O_4)_3$ |
| Praseodymium compounds | $Pr_2(CO_3)_3$, $Pr(NO_3)_3$ |
| Samarium compounds | $Sm_2(C_2O_4)_3$, $Sm(NO_3)_3$ |
| Zirconium compounds | $BaZrO_3$, $CaZrO_3$, $ZrCl_4$, $ZrO(NO_3)_2$, $ZrO(CH_3COO)_2$ |
| Tin compounds | $BaSnO_3$, $CaSnO_3$, $Sn(OCH_3)_4$ |
| Titanium compounds | $BaTiO_3$, $CaTiO_3$, $TiCl_4$, $Ti(OCH_3)_4$ |

Further, in the above embodiment 2 and 4, $BaTiO_3$, $BaZrO_3$, $BaSnO_3$ were made previously, and these materials were weighed and mixed, but the method for obtaining $Ba(Ti_{1-x-y} Zr_x Sn_y)O_3$ is not limited to this method. $Ba(Ti_{1-x-y} Zr_x Sn_y)O_3$ may be made by mixing $BaCO_3$, $TiO_2$, $ZrO_2$, $SnO_2$ which have small content of alkli metal oxide, and calcinating these mixture at prescribed temperature. Also using the material, the same characteristics can be obtained.

While the present invention has been particularly described and shown, it is to be understood that it is for the purpose of illustration and example and not for limitation. The spirit and scope of the invention is therefore to be determined solely by the accompanying claims.

TABLE 1

| KIND OF $BaTiO_3$ | AMOUNT OF IMPURITY (wt %) | | | |
|---|---|---|---|---|
| | ALKALI METAL OXIDE | SrO | $SiO_2$ | $Al_2O_3$ |
| A | 0.008 | 0.012 | 0.025 | 0.009 |
| B | 0.018 | 0.091 | 0.032 | 0.014 |
| C | 0.037 | 0.055 | 0.040 | 0.010 |
| D | 0.055 | 0.142 | 0.038 | 0.035 |

TABLE 2

| SAMPLE No. | KIND OF BaTiO$_3$ | BaTiO$_3$ (mol %) | La$_2$O$_3$ (mol %) | CeO$_2$ (mol %) | Pr$_6$O$_{11}$ (mol %) | Nd$_2$O$_3$ (mol %) | Sm$_2$O$_3$ (mol %) | (Zr$_{1-a-b}$Sn$_a$Ti$_b$)O$_2$ (mol %) | a | b |
|---|---|---|---|---|---|---|---|---|---|---|
| *1  | A | 100 | —   | 1.0 | —   | 0.5 | —   | 4.0  | 0.5 | 0.2 |
| *2  | A | 100 | 1.5 | —   | —   | —   | 0.5 | 3.5  | 0.7 | 0.1 |
| 3   | A | 100 | —   | 1.5 | —   | 1.0 | —   | 8.5  | 0.4 | 0.1 |
| 4   | A | 100 | 1.0 | 2.0 | —   | —   | —   | 3.0  | 0.1 | 0.5 |
| 5   | A | 100 | —   | 1.0 | 1.0 | 1.0 | —   | 7.0  | 0.3 | 0.4 |
| 6   | A | 100 | —   | 4.0 | —   | —   | —   | 6.0  | 0.1 | 0.1 |
| 7   | A | 100 | —   | 2.0 | 1.0 | 1.0 | —   | 2.0  | 0.1 | 0.3 |
| 8   | A | 100 | —   | 2.5 | —   | 1.0 | 0.5 | 6.0  | 0.4 | 0.2 |
| 9   | A | 100 | —   | —   | 1.0 | 3.0 | 0.5 | 4.5  | 0.2 | 0.7 |
| 10  | A | 100 | —   | 3.0 | —   | 2.0 | —   | 0.5  | 0.6 | 0.1 |
| 11  | B | 100 | —   | 3.0 | —   | 1.0 | —   | 6.0  | 0.3 | 0.3 |
| 12  | B | 100 | —   | 3.0 | —   | 1.0 | —   | 4.0  | 0.7 | 0.3 |
| *13 | A | 100 | —   | 5.5 | —   | —   | —   | 4.0  | 0.2 | 0.2 |
| *14 | A | 100 | —   | 1.0 | —   | 4.5 | 1.5 | 0.5  | 0.2 | 0.5 |
| *15 | B | 100 | —   | 3.0 | —   | 1.0 | —   | 0.3  | 0.2 | 0.2 |
| *16 | A | 100 | —   | 3.0 | —   | 1.0 | —   | 10.0 | 0.2 | 0.3 |
| *17 | A | 100 | —   | 3.0 | —   | 1.0 | —   | 5.0  | 0   | 0   |
| *18 | C | 100 | —   | 3.0 | —   | 1.0 | —   | 6.0  | 0.3 | 0.3 |
| *19 | D | 100 | —   | 3.0 | —   | 1.0 | —   | 6.0  | 0.3 | 0.3 |

*indicates ranges outside the invention

TABLE 3

| SAMPLE No. | FIRING TEMPERATURE (°C.) | DIELECTRIC CONSTANT $\epsilon$ | DIELECTRIC LOSS tan $\delta$ (%) | $\Delta C/C_{20}$ (%) −25° C. | $\Delta C/C_{20}$ (%) +85° C. | DIELECTRIC LOSS WHEN APPLYING AC VOLTAGE tan $\delta$ (%) | GRAIN SIZE (μm) |
|---|---|---|---|---|---|---|---|
| *1  | 1320 | 10500 | 0.5 | −55 | −68 | 3.0 | 6.0 |
| *2  | 1320 | 11000 | 0.4 | −50 | −73 | 2.8 | 4.5 |
| 3   | 1300 | 11500 | 0.3 | −47 | −75 | 2.0 | 2.0 |
| 4   | 1320 | 12500 | 0.3 | −45 | −77 | 2.2 | 2.0 |
| 5   | 1320 | 12000 | 0.4 | −50 | −75 | 2.5 | 2.5 |
| 6   | 1320 | 11500 | 0.3 | −44 | −77 | 3.0 | 1.0 |
| 7   | 1320 | 12200 | 0.3 | −47 | −77 | 2.0 | 1.5 |
| 8   | 1320 | 12100 | 0.3 | −45 | −76 | 2.2 | 1.0 |
| 9   | 1320 | 11800 | 0.4 | −45 | −75 | 2.6 | 3.0 |
| 10  | 1350 | 12700 | 0.4 | −50 | −78 | 2.5 | 1.0 |
| 11  | 1320 | 11900 | 0.4 | −47 | −76 | 2.0 | 1.0 |
| 12  | 1320 | 12000 | 0.3 | −50 | −79 | 1.9 | 1.0 |
| *13 | 1350 | 8300  | 0.1 | −38 | −79 | 1.7 | 1.0 |
| *14 |      |       |     | NOT SINTERED | | | |
| *15 | 1350 | 12500 | 0.5 | −55 | −84 | 3.0 | 2.0 |
| *16 | 1320 | 9800  | 0.4 | −40 | −70 | 2.4 | 2.0 |
| *17 | 1320 | 11500 | 0.8 | −50 | −73 | 6.0 | 2.0 |
| *18 | 1320 | 9500  | 0.3 | −45 | −74 | 2.0 | 2.0 |
| *19 | 1320 | 8700  | 0.3 | −45 | −73 | 1.8 | 2.0 |

*indicates ranges outside the invention

TABLE 4

| SAMPLE No. | KIND OF BaTiO$_3$ | BaTiO$_3$ (mol %) | La$_2$O$_3$ (mol %) | CeO$_2$ (mol %) | Pr$_6$O$_{11}$ (mol %) | Nd$_2$O$_3$ (mol %) | Sm$_2$O$_3$ (mol %) | Ba(Zr$_{1-a}$Sn$_a$)O$_3$ (mol %) | a | TiO$_2$ (mol %) |
|---|---|---|---|---|---|---|---|---|---|---|
| *101 | A | 100 | —   | 1.0 | —   | 0.5 | —   | 4.0 | 0.3 | 3.0 |
| *102 | A | 100 | 1.5 | —   | —   | —   | 0.5 | 4.0 | 0.6 | 1.5 |
| 103  | A | 100 | —   | 2.0 | —   | 0.5 | —   | 5.0 | 0.4 | 1.5 |
| 104  | A | 100 | 2.0 | 1.0 | —   | —   | —   | 3.0 | 0.7 | 3.0 |
| 105  | A | 100 | —   | 1.0 | 1.0 | 1.0 | —   | 4.5 | 0.4 | 3.5 |
| 106  | A | 100 | —   | 4.0 | —   | —   | —   | 2.0 | 0.2 | 4.0 |
| 107  | A | 100 | —   | 2.0 | 1.0 | 1.0 | —   | 1.0 | 0.9 | 4.0 |
| 108  | A | 100 | —   | 2.5 | —   | 1.0 | 0.5 | 2.5 | 0.1 | 3.5 |
| 109  | A | 100 | —   | —   | 1.0 | 3.0 | 0.5 | 1.0 | 0.5 | 4.5 |
| 110  | B | 100 | —   | 3.0 | —   | 2.0 | —   | 0.5 | 0.8 | 6.0 |
| 111  | A | 100 | —   | 3.0 | —   | 1.0 | —   | 3.0 | 0.5 | 4.0 |
| 112  | A | 100 | —   | 3.0 | —   | 1.0 | —   | 3.0 | 1.0 | 4.0 |
| *113 | A | 100 | —   | 5.5 | —   | —   | —   | 2.0 | 0.6 | 5.5 |
| *114 | A | 100 | —   | 1.0 | —   | 4.5 | 1.5 | 2.0 | 0.3 | 3.0 |
| *115 | B | 100 | —   | 3.0 | —   | 1.0 | —   | 0.1 | 0.5 | 4.0 |
| *116 | A | 100 | —   | 3.0 | —   | 1.0 | —   | 8.0 | 0.4 | 4.0 |
| *117 | A | 100 | —   | 3.0 | —   | 1.0 | —   | 5.0 | 0   | 4.0 |
| *118 | C | 100 | —   | 3.0 | —   | 1.0 | —   | 3.0 | 0.5 | 4.0 |
| *119 | D | 100 | —   | 3.0 | —   | 1.0 | —   | 3.0 | 0.5 | 4.0 |
| *120 | B | 100 | —   | 3.0 | —   | 1.0 | 1.0 | 1.0 | 0.6 | 1.0 |

TABLE 4-continued

| SAMPLE No. | KIND OF BaTiO$_3$ | BaTiO$_3$ (mol %) | La$_2$O$_3$ (mol %) | CeO$_2$ (mol %) | Pr$_6$O$_{11}$ (mol %) | Nd$_2$O$_3$ (mol %) | Sm$_2$O$_3$ (mol %) | Ba(Zr$_{1-a}$Sn$_a$)O$_3$ (mol %) | a | TiO$_2$ (mol %) |
|---|---|---|---|---|---|---|---|---|---|---|
| *121 | B | 100 | — | 3.0 | — | — | — | 2.0 | 0.6 | 8.0 |

*indicates ranges outside the invention

TABLE 5

| SAMPLE No. | FIRING TEMPERATURE (°C.) | DIELECTRIC CONSTANT ε | DIELECTRIC LOSS tan δ (%) | ΔC/C$_{20}$ (%) −25° C. | ΔC/C$_{20}$ (%) +85° C. | DIELECTRIC LOSS WHEN APPLYING AC VOLTAGE tan δ (%) | RESISTIVITY (Ω · cm) 25° C. | RESISTIVITY (Ω · cm) 125° C. | GRAIN SIZE (μm) |
|---|---|---|---|---|---|---|---|---|---|
| *101 | 1320 | 10700 | 0.7 | −57 | −72 | 3.2 | >10$^{13}$ | >10$^{10}$ | 6.0 |
| *102 | 1320 | 11200 | 0.5 | −52 | −75 | 2.5 | >10$^{13}$ | >10$^{10}$ | 4.5 |
| 103 | 1300 | 11600 | 0.4 | −51 | −77 | 2.2 | >10$^{13}$ | >10$^{10}$ | 2.0 |
| 104 | 1320 | 12500 | 0.6 | −54 | −75 | 2.4 | >10$^{13}$ | >10$^{10}$ | 2.5 |
| 105 | 1300 | 12000 | 0.4 | −52 | −77 | 2.2 | >10$^{13}$ | >10$^{10}$ | 2.5 |
| 106 | 1320 | 12000 | 0.5 | −52 | −76 | 2.2 | >10$^{13}$ | >10$^{10}$ | 1.0 |
| 107 | 1320 | 12700 | 0.7 | −56 | −75 | 2.6 | >10$^{13}$ | >10$^{10}$ | 2.0 |
| 108 | 1300 | 12200 | 0.5 | −54 | −76 | 2.5 | >10$^{13}$ | >10$^{10}$ | 1.0 |
| 109 | 1320 | 12700 | 0.6 | −54 | −78 | 2.7 | >10$^{13}$ | >10$^{10}$ | 3.0 |
| 110 | 1320 | 12800 | 0.7 | −55 | −78 | 2.8 | >10$^{13}$ | >10$^{10}$ | 1.0 |
| 111 | 1300 | 11500 | 0.3 | −53 | −75 | 2.1 | >10$^{13}$ | >10$^{10}$ | 1.0 |
| 112 | 1320 | 11200 | 0.3 | −55 | −78 | 2.0 | >10$^{13}$ | >10$^{10}$ | 1.5 |
| *113 | 1350 | 9000 | 0.1 | −50 | −80 | 1.8 | >10$^{13}$ | >10$^{10}$ | 1.0 |
| *114 | | | | NOT SINTERED | | | | | |
| *115 | 1350 | 12300 | 0.5 | −56 | −83 | 3.2 | >10$^{13}$ | >10$^{10}$ | 2.0 |
| *116 | 1300 | 8500 | 0.2 | −48 | −78 | 2.9 | >10$^{13}$ | >10$^{10}$ | 2.5 |
| *117 | 1320 | 11100 | 0.5 | −50 | −72 | 6.3 | >10$^{13}$ | >10$^{10}$ | 2.0 |
| *118 | 1320 | 9500 | 0.3 | −47 | −75 | 2.0 | >10$^{13}$ | >10$^{10}$ | 1.5 |
| *119 | 1320 | 8600 | 0.3 | −47 | −74 | 1.9 | >10$^{13}$ | >10$^{10}$ | 1.5 |
| *120 | | | | NOT SINTERED | | | | | |
| *121 | 1300 | | | UNMEASURABLE | | | 10$^7$ | <10$^5$ | 3.0 |

*indicates ranges outside the invention

TABLE 6

| COMPOSITE | ELECTROSTATIC CAPACITANCE (nF) | DIELECTRIC LOSS tan δ (%) | INSULATION RESISTANCE I R (Ω) | ΔC/C$_{20}$ (%) −25° C. | ΔC/C$_{20}$ (%) +85° C. | BREAKDOWN VOLTAGE BDV (V) | BREAK-RESISTANT STRENGTH (kg) | GRAIN SIZE (μm) |
|---|---|---|---|---|---|---|---|---|
| PRESENT INVENTION | 367 | 2.0 | 3 × 10$^{11}$ | −40 | −78 | 1000 | 20.5 | 1.0 |
| COMPARATIVE EXAMPLE | 440 | 6.5 | 2 × 10$^{11}$ | −75 | −80 | 420 | 6.2 | 8.0 |

TABLE 7

| COMPOSITE | ELECTROSTATIC CAPACITANCE (nF) | DIELECTRIC LOSS tan δ (%) | INSULATION RESISTANCE I R (Ω) | ΔC/C$_{20}$ (%) −25° C. | ΔC/C$_{20}$ (%) +85° C. | BREAKDOWN VOLTAGE BDV (V) | BREAK-RESISTANT STRENGTH (kg) | GRAIN SIZE (μm) |
|---|---|---|---|---|---|---|---|---|
| PRESENT INVENTION | 362 | 2.1 | 4 × 10$^{11}$ | −45 | −78 | 1000 | 21.0 | 1.5 |
| COMPARATIVE EXAMPLE | 440 | 6.5 | 2 × 10$^{11}$ | −75 | −80 | 420 | 6.2 | 8.0 |

TABLE 8

| SAMPLE No. | BaTiO$_3$ (mol %) | La$_2$O$_3$ (mol %) | CeO$_2$ (mol %) | Pr$_6$O$_{11}$ (mol %) | Nd$_2$O$_3$ (mol %) | Sm$_2$O$_3$ (mol %) | (Zr$_{1-a-b}$Sn$_a$Ti$_b$)O$_2$ (mol %) | a | b | FIRING PATTERN | FIRING TEMPERATURE (°C.) | OXYGEN CONCENTRATION (%) |
|---|---|---|---|---|---|---|---|---|---|---|---|---|
| *21 | 100 | — | 1.0 | — | 0.5 | — | 4.0 | 0.5 | 0.2 | B | 1300 | 95 |
| *22 | 100 | 1.5 | — | — | — | 0.5 | 3.5 | 0.2 | 0.7 | B | 1300 | 95 |
| *23 | 100 | — | 3.0 | — | 1.0 | — | 0.3 | 0.2 | 0.2 | B | 1300 | 95 |
| 24 | 100 | — | 1.5 | — | 1.0 | — | 8.5 | 0.4 | 0.1 | B | 1280 | 95 |
| 25 | 100 | 1.0 | 2.0 | — | — | — | 3.0 | 0.1 | 0.5 | C | 1300 | 95 |
| 26 | 100 | — | 1.0 | 1.0 | 1.0 | — | 7.0 | 0.3 | 0.4 | B | 1280 | 95 |
| 27 | 100 | — | 4.0 | — | — | — | 6.0 | 0.1 | 0.1 | B | 1280 | 95 |
| 28 | 100 | — | 2.0 | 1.0 | 1.0 | — | 2.0 | 0.1 | 0.3 | C | 1280 | 80 |
| 29 | 100 | — | 2.5 | — | 1.0 | 0.5 | 6.0 | 0.4 | 0.2 | B | 1300 | 60 |
| 30 | 100 | — | — | 1.0 | 3.0 | 0.5 | 4.5 | 0.2 | 0.7 | B | 1280 | 95 |

TABLE 8-continued

| SAMPLE No. | BaTiO$_3$ (mol %) | La$_2$O$_3$ (mol %) | CeO$_2$ (mol %) | Pr$_6$O$_{11}$ (mol %) | Nd$_2$O$_3$ (mol %) | Sm$_2$O$_3$ (mol %) | (Zr$_{1-a-b}$Sn$_a$Ti$_b$)O$_2$ (mol %) | a | b | FIRING PATTERN | FIRING TEMPERATURE (°C.) | OXYGEN CONCENTRATION (%) |
|---|---|---|---|---|---|---|---|---|---|---|---|---|
| 31 | 100 | — | 3.0 | — | 2.0 | — | 0.5 | 0.6 | 0.1 | B | 1300 | 95 |
| 32 | 100 | — | 3.0 | — | 1.0 | — | 6.0 | 0.3 | 0.3 | B | 1280 | 95 |
| 33 | 100 | — | 3.0 | — | 0.5 | — | 5.0 | 0.6 | 0.4 | C | 1280 | 95 |
| *34 | 100 | — | 5.5 | — | — | — | 4.0 | 0.2 | 0.2 | B | 1300 | 95 |
| *35 | 100 | — | 3.0 | — | 1.0 | — | 10.0 | 0.2 | 0.4 | C | 1280 | 95 |
| *36 | 100 | — | 3.0 | — | 1.0 | — | 5.0 | 0 | 0 | B | 1300 | 95 |
| *37 | 100 | — | 4.0 | 1.0 | — | — | 6.0 | 0.1 | 0.1 | B | 1320 | 55 |
| *38 | 100 | 1.0 | 2.0 | — | 2.0 | — | 6.0 | 0.3 | 0.2 | A | 1320 | IN THE AIR |

*indicates ranges outside the invention

TABLE 9

| SAMPLE No. | DIELECTRIC CONSTANT $\epsilon$ | DIELECTRIC LOSS tan $\delta$ (%) | $\Delta C/C_{20}$ (%) −25° C. | $\Delta C/C_{20}$ (%) +85° C. | DIELECTRIC LOSS WHEN APPLYING AC VOLTAGE tan $\delta$ (%) | GRAIN SIZE (μm) |
|---|---|---|---|---|---|---|
| *21 | 9800 | 0.5 | −56 | −70 | 2.7 | 6.0 |
| *22 | 11000 | 0.4 | −55 | −74 | 2.8 | 5.0 |
| *23 | 13500 | 0.4 | −49 | −83 | 2.4 | 1.0 |
| 24 | 13000 | 0.3 | −48 | −76 | 2.1 | 2.0 |
| 25 | 13900 | 0.4 | −46 | −77 | 2.3 | 2.0 |
| 26 | 13500 | 0.4 | −50 | −76 | 2.5 | 2.5 |
| 27 | 13100 | 0.3 | −46 | −78 | 3.0 | 1.0 |
| 28 | 13800 | 0.5 | −49 | −78 | 2.0 | 1.5 |
| 29 | 13600 | 0.4 | −47 | −76 | 2.4 | 1.0 |
| 30 | 13200 | 0.3 | −48 | −77 | 2.7 | 3.0 |
| 31 | 13700 | 0.4 | −50 | −78 | 2.6 | 1.0 |
| 32 | 13300 | 0.3 | −47 | −77 | 2.2 | 1.0 |
| 33 | 13500 | 0.4 | −52 | −79 | 2.0 | 1.0 |
| *34 | 9700 | 0.2 | −40 | −79 | 1.8 | 1.0 |
| *35 | 10800 | 0.5 | −43 | −71 | 2.4 | 2.0 |
| *36 | 13100 | 0.8 | −52 | −74 | 6.3 | 2.0 |
| *37 | 10700 | 0.3 | −47 | −77 | 2.1 | 1.0 |
| *38 | 10100 | 0.2 | −45 | −79 | 1.8 | 1.0 |

*indicates ranges outside the invention

What is claimed is:

1. A dielectric ceramic composition containing at least one compound selected from the group consisting of lanthanum oxide, cerium oxide, neodymium oxide, praseodymium oxide and samarium oxide in an amount of 2.5-5.0 mol %, zirconium oxide, tin oxide and titanium oxide in an amount of 0.5-8.5 mol % according to a formula (Zr$_{1-a-b}$ Sn$_a$ Ti$_b$)O$_2$ (where a>0, b≧0, 0<a+b≦1.0), and barium titanate in an amount of 86.5-97.0 mol %, containing alkali metal oxide less than 0.03% by weight as an impurity.

2. A dielectric ceramic composition containing at least one compound selected from the group consisting of lanthanum oxide, cerium oxide, neodymium oxide, praseodymium oxide and samarium oxide in an amount of 2.5-5.0 mol %, barium zirconate and barium stannate in an amount of 0.5-5.0 mol % according to a formula Ba(Zr$_{1-a}$ Sn$_a$)O$_3$ (where 0<a≦1.0), titanium oxide in an amount of 1.5-6.0 mol %, and barium titanate in an amount of 86.5-95.5 mol %, containing alkali metal oxide less than 0.03% by weight as an impurity.

3. A method of manufacturing a dielectric ceramic composition comprising the steps of:

preparing a molded composition containing at least one compound selected from the group consisting of lanthanum oxide, cerium oxide, neodymium oxide, praseodymium oxide, and samarium oxide in an amount of 2.5-5.0 mol %;

zirconium oxide, tin oxide and titanium oxide in an amount of 0.5-8.5 mol % according to a formula (Zr$_{1-a-b}$ Sn$_a$ Ti$_b$)O$_2$ (where a>0, b≧0, 0<a+b≦1.0); and barium titanate in an amount of 86.5-97.0 mol % and firing said molded composition in an atmosphere of 60% or more oxygen concentration.

4. A method as in claim 3, wherein said barium titanate contains less than 0.03% by weight of alkali metal oxide as an impurity.

5. A method of manufacturing a dielectric ceramic composition comprising the steps of:

preparing a molded composition containing at least one compound selected from the group consisting of a lanthanum compound, a cerium compound, a neodymium compound, a praseodymium compound, and samarium compound in an amount of 2.5-5.0 mol %;

zirconium compound, a tin compound and a titanium compound in an amount of 0.5-8.5 mol % according to a formula (Zr$_{1-a-b}$ Sn$_a$ Ti$_b$) (where a>0, b≧0, 0<a+b≦1.0); and barium titanate in an amount of 86.5-97.0 mol % and firing said molded composition, in an atmosphere of 60% or more oxygen concentration.

6. A method in claim 5, wherein said compounds are selected from the group consisting of $La_2CO_3$, $La(NO_3)_2$, $La(C_2O_4)_3$, $CeCO_3$, $Ce(NO_3)_3$, $Ce(OH)_4$, $Nd(OH)_3$, $Nd(NO_3)_3$, $Nd_2(CO_3)_3$, $Nd_2(C_2O_4)_3$, $Pr_2(CO_3)_3$, $Pr(NO_3)_3$, $Sm_2(C_2O_4)_3$, $Sm(NO_3)_3$, $BaZrO_3$, $CaZrO_3$, $ZrCl_4$, $ZrO(NO_3)_2$, $ZrO(CH_3COO)_2$, $BaSnO_3$, $CaSnO_3$, $Sn(OCH_3)_4$, $BaTiO_3$, $CaTiO_3$, $TiCl_4$ and $Ti(OCH_3)_4$.

7. A method as in claim 5, wherein said barium titanate contains less than 0.03% by weight of alkali metal oxide as an impurity.

* * * * *